(12) United States Patent
Akamatsu et al.

(10) Patent No.: US 11,292,073 B2
(45) Date of Patent: Apr. 5, 2022

(54) WELDING TORCH AND ALL-POSITION WELDING DEVICE

(71) Applicant: KAWASAKI JUKOGYO KABUSHIKI KAISHA, Kobe (JP)

(72) Inventors: Masahiko Akamatsu, Himeji (JP); Shingo Yonemoto, Kakogawa (JP); Takanori Kozuki, Kakogawa (JP); Shinya Hibino, Kobe (JP); Yukio Ikezawa, Kobe (JP); Kenichiro Niimi, Kakogawa (JP); Akitsugu Arao, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 283 days.

(21) Appl. No.: 16/469,736

(22) PCT Filed: Dec. 14, 2017

(86) PCT No.: PCT/JP2017/044946
§ 371 (c)(1),
(2) Date: Jun. 14, 2019

(87) PCT Pub. No.: WO2018/110657
PCT Pub. Date: Jun. 21, 2018

(65) Prior Publication Data
US 2020/0086415 A1    Mar. 19, 2020

(30) Foreign Application Priority Data
Dec. 14, 2016    (JP) .............................. JP2016-242469

(51) Int. Cl.
*B23K 9/16*    (2006.01)
*B23K 9/167*    (2006.01)
(Continued)

(52) U.S. Cl.
CPC .............. *B23K 9/167* (2013.01); *B23K 9/296* (2013.01); *B23K 9/0286* (2013.01);
(Continued)

(58) Field of Classification Search
CPC .......... B23K 9/167; B23K 9/29; B23K 9/291; B23K 9/24; B23K 9/285; B23K 9/0282; B23K 9/16
See application file for complete search history.

(56) References Cited

U.S. PATENT DOCUMENTS 3,521,023 A * 7/1970 Dahlman ............... B23K 10/02
219/75
4,567,373 A * 1/1986 O'Meara, Jr. ........... B04B 13/00
250/573

(Continued)

FOREIGN PATENT DOCUMENTS

JP    S57-032784 U    2/1982
JP    H09-271939 A    10/1997
(Continued)

OTHER PUBLICATIONS

Feb. 27, 2018 Search Report issued in International Application No. PCT/JP2017/044946.

*Primary Examiner* — Brian W Jennison
(74) *Attorney, Agent, or Firm* — Oliff PLC

(57) ABSTRACT

A welding torch includes a gas lens of a lattice structure that straightens a shielding gas. The welding torch includes a non-consumable electrode, an electrode holder into which the non-consumable electrode is inserted, and a torch body including a sleeve that holds the electrode holder, a flow path forming portion that forms a shielding gas flow path around the sleeve, and a nozzle that forms a shielding gas guiding space around a distal end of the non-consumable electrode, the distal end extending from the electrode holder, in which
(Continued)

the gas lens is provided so as to separate the shielding gas flow path from the shielding gas guiding space.

9 Claims, 9 Drawing Sheets

(51) Int. Cl.
    *B23K 9/29*            (2006.01)
    *B23K 103/04*        (2006.01)
    *B23K 101/06*        (2006.01)
    *B23K 9/028*         (2006.01)
    *B23K 9/28*           (2006.01)
    *B23K 10/02*         (2006.01)
(52) U.S. Cl.
    CPC ............ *B23K 9/0288* (2013.01); *B23K 9/285* (2013.01); *B23K 10/02* (2013.01); *B23K 2101/06* (2018.08); *B23K 2103/04* (2018.08)

(56) References Cited

U.S. PATENT DOCUMENTS

| | | | | |
|---|---|---|---|---|
| 5,393,949 | A | * | 2/1995 | Stricklen ................ B23K 9/167 |
| | | | | 219/74 |
| 9,095,922 | B1 | * | 8/2015 | Shearin ................... B23K 9/326 |
| 9,338,873 | B1 | * | 5/2016 | Furick ....................... H05H 1/34 |
| 10,960,484 | B2 | * | 3/2021 | Hoeger .............. B23K 26/1464 |
| 2002/0134760 | A1 | * | 9/2002 | Rehrig ................... B23K 9/295 |
| | | | | 219/75 |
| 2006/0076320 | A1 | | 4/2006 | Watanabe et al. |
| 2015/0275369 | A1 | | 10/2015 | Terada et al. |

FOREIGN PATENT DOCUMENTS

| | | |
|---|---|---|
| JP | 2001-225165 A | 8/2001 |
| JP | 2006-136938 A | 6/2006 |
| JP | 2012-139704 A | 7/2012 |
| JP | 2015-174141 A | 10/2015 |
| JP | 2015-196839 A | 11/2015 |

* cited by examiner

WELDING TORCH AND ALL-POSITION WELDING DEVICE

TECHNICAL FIELD

The present invention relates to a welding torch suitable for an all-position welding device that performs butt welding of tubes, and an all-position welding device including the welding torch.

BACKGROUND ART

Heretofore, an all-position welding device has been known which automatically performs butt welding between tubes. Such an all-position welding device may be used, for example, in the manufacture of an apparatus in which a plurality of tubes are arranged at a narrow pitch, such as a boiler panel. PTL 1 discloses a welding torch capable of passing through such a narrow gap as described above, and an all-position welding device including the welding torch.

The welding torch of PTL 1 includes a non-consumable electrode, a collet into which the non-consumable electrode is inserted, a torch body, and a highly rigid porous ring. The torch body has a ceiling wall which is penetrated by the collet, and a body which encloses the ceiling wall and a shielding gas flow path facing the collet. The porous ring is joined to the body of the torch body so as to close the shielding gas flow path, and has a tapered inner peripheral surface that comes into contact with the distal end of the collet. In this welding torch, the non-consumable electrode is held by the collet by the diameter of the distal end of the collet into which the non-consumable electrode is inserted being reduced by the inner peripheral surface of the porous ring.

CITATION LIST

Patent Literature

PTL 1: JP 2015-174141 A

SUMMARY OF INVENTION

Technical Problem

The porous ring of the welding torch of PTL 1 is a rigid body having a porosity of 30 to 60%. The porous ring is integrally formed on the torch body by, for example, pulse-wise irradiating a metal powder used as a raw material with a laser beam using a 3D printer.

Solution to Problem

However, when a porous ring is formed by the above method using a 3D printer, it is difficult to stably control the porosity of the porous ring. Therefore, the welding torch of PTL 1 has room for improvement in terms of yield improvement.

Therefore, a welding torch according to an aspect of the present invention includes the gas lens of a lattice structure that straightens a shielding gas.

An all-position welding device according to an aspect of the present invention performs butt welding of tubes, and includes the welding torch and a rotation mechanism for rotating the welding torch around the tubes.

In the above-mentioned welding torch and all-position welding device, the gas lens has a lattice structure. By forming the gas lens in a lattice structure, the gas lens formed by using a 3D printer has regular gaps. Therefore, the porosity of the gas lens is stabilized, compared with the case where the gas lens is a porous body. Therefore, the improvement of the yield of the welding torch including the gas lens is expected.

Advantageous Effect of Invention

According to the present invention, it is possible to achieve an improvement in the yield of a welding torch including a gas lens formed using a 3D printer.

DESCRIPTION OF EMBODIMENT

Next, an embodiment of the present invention will be described with reference to the drawings. First, a schematic configuration of an all-position welding device 1 according to an embodiment of the present invention will be described.

[All-Position Welding Device 1]

Figure 1:
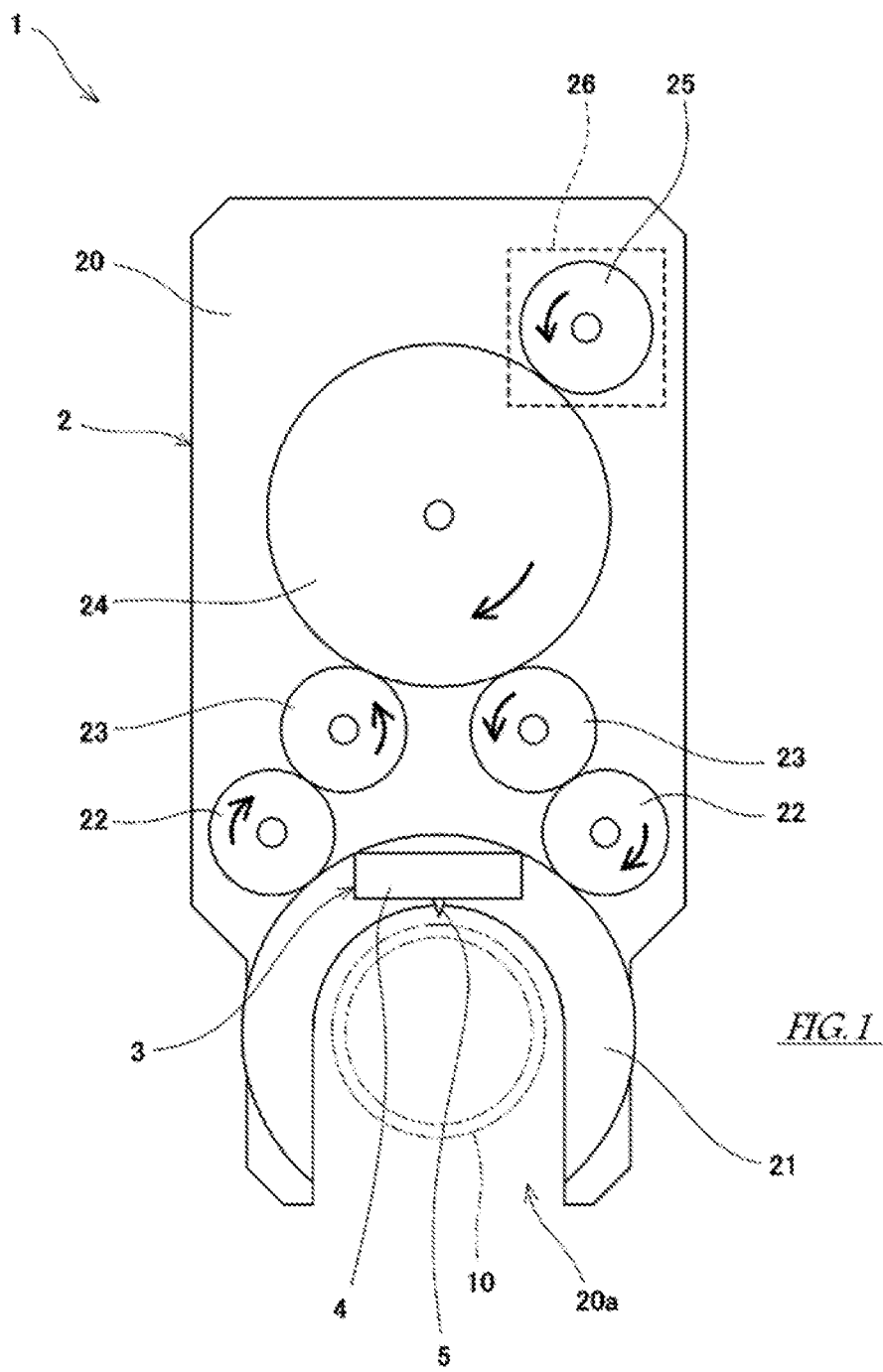
FIG. 1 is a front view of an all-position welding device equipped with a welding torch according to an embodiment of the present invention.
Figure 2:
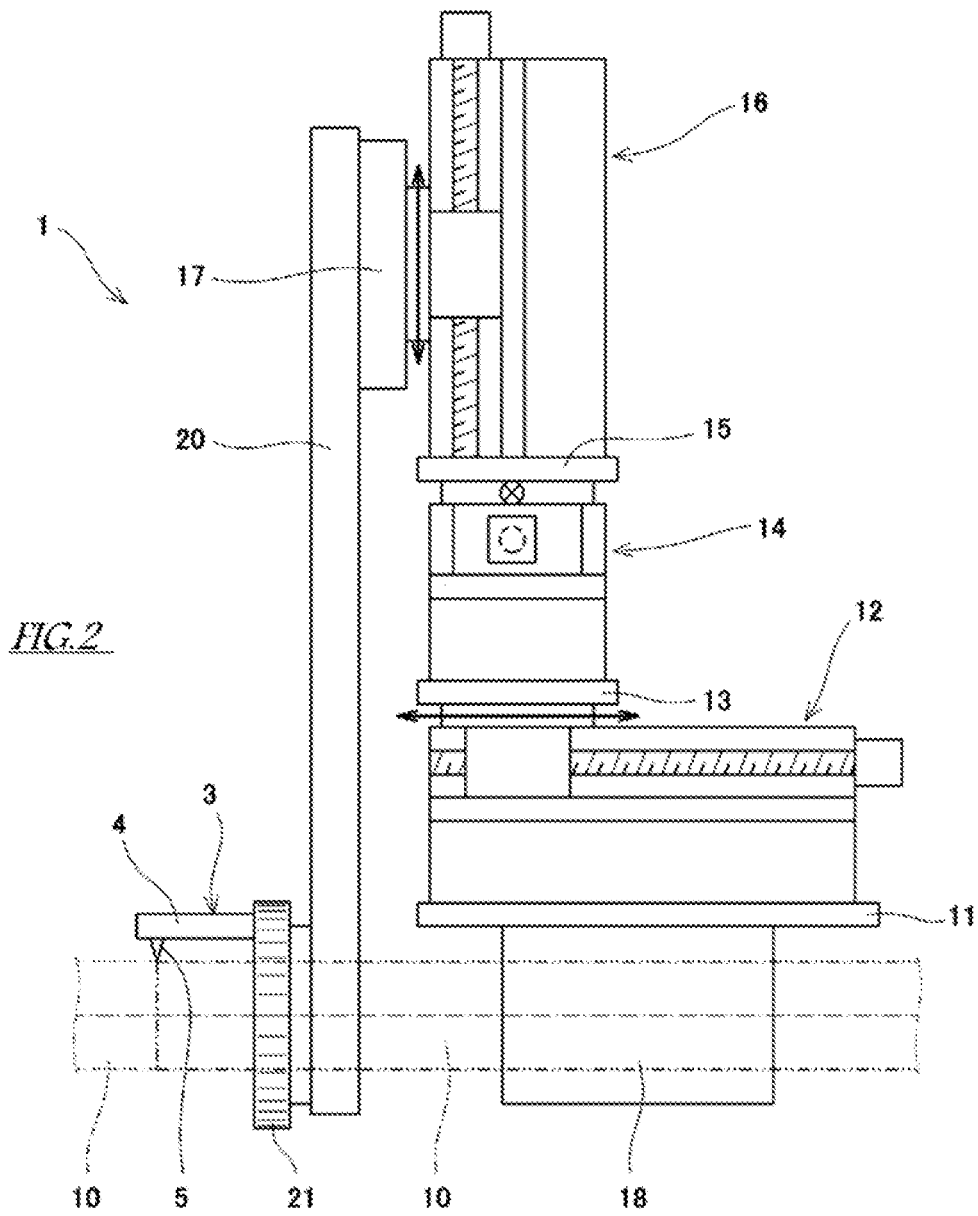
FIG. 2 is a side view of the all-position welding device shown in FIG. 1.

The all-position welding device 1 shown in FIGS. 1 and 2 automatically performs butt welding of tubes 10. The welding method may be, for example, tungsten inert gas (TIG) welding.

The welding device 1 includes a welding torch 3, a rotation mechanism 2 for rotating the welding torch 3 around the tube 10, and three linear motion mechanisms for moving the welding torch 3 in a three-dimensional manner (a first linear motion mechanism 12, a second linear motion mechanism 14 and a third linear motion mechanism 16).

The first linear motion mechanism 12 moves the welding torch 3 in the axial direction (e.g., the horizontal direction) of the tube 10, the second linear motion mechanism 14 and the third linear motion mechanism 16 move the welding torch 3 in mutually orthogonal directions (for example, the horizontal direction and the vertical direction) on the plane orthogonal to the axial direction of the tube 10. However, in order to move the welding torch 3 in a three-dimensional manner, it is not necessary to use three linear motion mechanisms. For example, instead of the second linear motion mechanism 14 and the third linear motion mechanism 16, a radial direction moving mechanism may be used which moves the welding torch 3 in the radial direction of the tube 10 with respect to a rotating member 21 described later. Alternatively, the welding torch 3 need not necessarily be moved in a three-dimensional manner, and may be moved in a two-dimensional manner on a plane orthogonal to the axial direction of the tube 10.

The first linear motion mechanism 12 is attached to a base plate 11 parallel to the axial direction of the tube 10. The base plate 11 is provided with a clamp mechanism 18 for clamping the tube 10. The second linear motion mechanism 14 is fixed to the movable portion of the first linear motion mechanism 12 via a mounting seat 13. The third linear motion mechanism 16 is fixed to the movable portion of the second linear motion mechanism 14 via a mounting seat 15. Naturally, the positions of the first to third linear motion mechanisms 12, 14 and 16 can be interchanged with each other.

The rotation mechanism 2 includes a plate-shaped table 20 orthogonal to the axial direction of the tube 10. The table 20 is fixed to the movable portion of the third linear motion mechanism 16 via a mounting seat 17. The substantially U-shaped rotating member 21 into which the tube 10 can be fitted is rotatably supported on the table 20. Further, the table 20 is also formed with a notch 20a into which the tube 10 can be fitted.

The rotating member 21 has an arc-shaped outer peripheral surface when viewed from the axial direction of the tube 10, and external teeth are formed on the outer peripheral surface. A motor 26 is attached to the table 20, on which a gear train is supported. The gear train transmits torque from a drive gear 25 fixed to the output shaft of the motor 26 to the rotating member 21. In FIG. 2, the gear train and the motor 26 are omitted to simplify the figure.

The gear train described above includes a large diameter first driven gear 24 engaging with the drive gear 25, a pair of second driven gears 23 engaging with the first driven gear 24, and a pair of third driven gears 22 engaging with the second driven gears 23 and the rotating member 21. With such a configuration, even if the opening of the rotating member 21 reaches one of the third driven gears 22, torque is transmitted to the rotating member 21 by the other third driven gear 22.

The welding torch 3 is fixed, for example, to the center of the rotating member 21 so as to project in the axial direction of the tube 10. The welding torch 3 includes a plate-shaped torch body 4 orthogonal to the radial direction of the tube 10 and a non-consumable electrode 5 supported by the torch body 4 via an electrode holder 7.

The non-consumable electrode 5 is used for generating an arc between the non-consumable electrode 5 and a welding area of the tube 10. Here, the welding area is, for example, the bottom of the groove in the first layer and the previous layer in the second and subsequent layers when the groove is created at the joint of the tubes 10 and the welding layer is formed in many layers. A welding wire (not shown) is supplied from a wire supplying device (not shown) between the non-consumable electrode 5 and the welding area.

In the welding device 1 having the above configuration, the welding torch 3 is moved along the predetermined track by the first to third linear motion mechanisms 12, 14 and 16 while being rotated around the tube 10 by the rotation mechanism 2. At this time, the position of the welding torch 3 is finely adjusted by the first to third linear motion mechanisms 12, 14 and 16 so that the distance from the non-consumable electrode 5 to the welding area is a predetermined value.

The rotating member 21 has conductivity, the welding torch 3 including the torch body 4 and the non-consumable electrode 5 held thereby has conductivity, and the rotating member 21 supporting the welding torch 3 also has conductivity. Notches for tube insertion are formed at appropriate positions in the table 20 which makes the rotating member 21 rotatable. A power supply brush (not shown) which is continuously connected to the back surface of the rotating member 21 while the rotating member 21 rotates once is provided between the rotating member 21 and the table 20. In this manner, power is supplied to the welding torch 3 from the power supply brush via the rotating member 21. Therefore, the lines connected to welding torch 3 can be reduced, and the total thickness of the torch peripheral configuration can be reduced.

[Configuration of Welding Torch 3]

Figure 3:
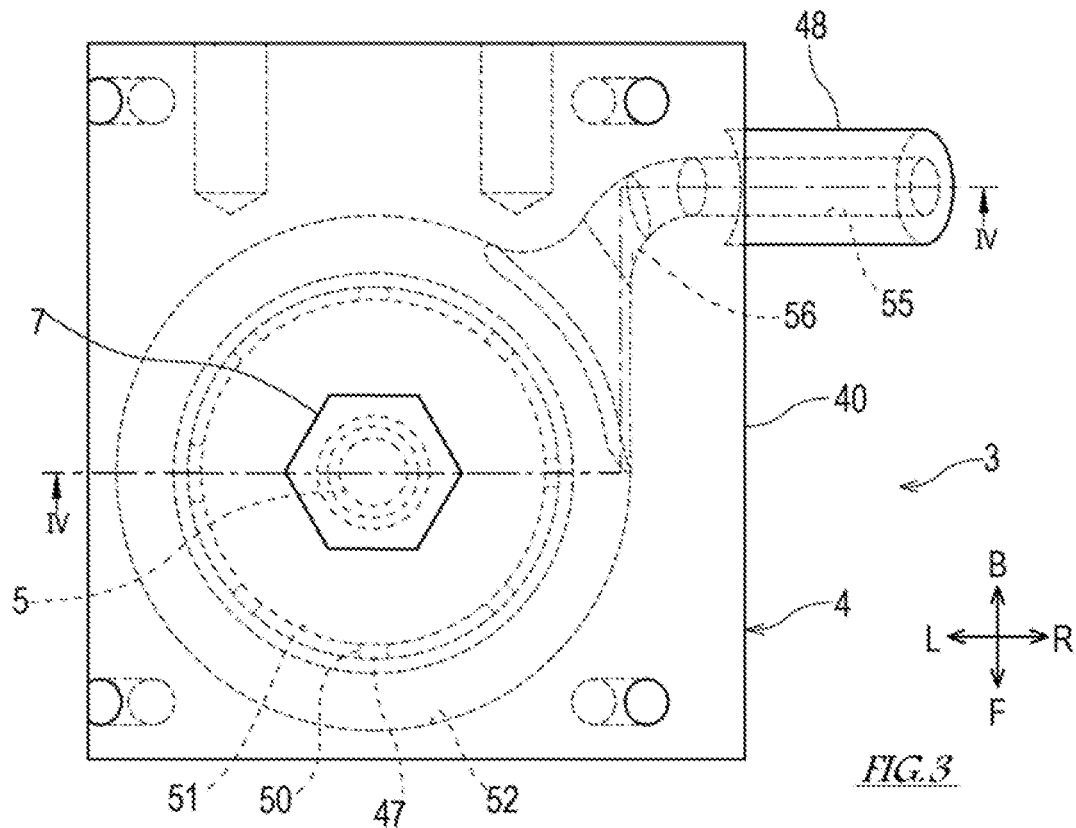
FIG. 3 is a plan view of a welding torch.

Here, the configuration of the welding torch 3 will be described in detail. FIG. 3 is a plan view of the welding torch 3, FIG. 4 is a sectional view taken along line IV-IV of FIG. 3, FIG. 5 is a sectional view taken along line V-V of FIG. 4, and FIG. 6 is a sectional view taken along line VI-VI of FIG. 4.

Figure 4:
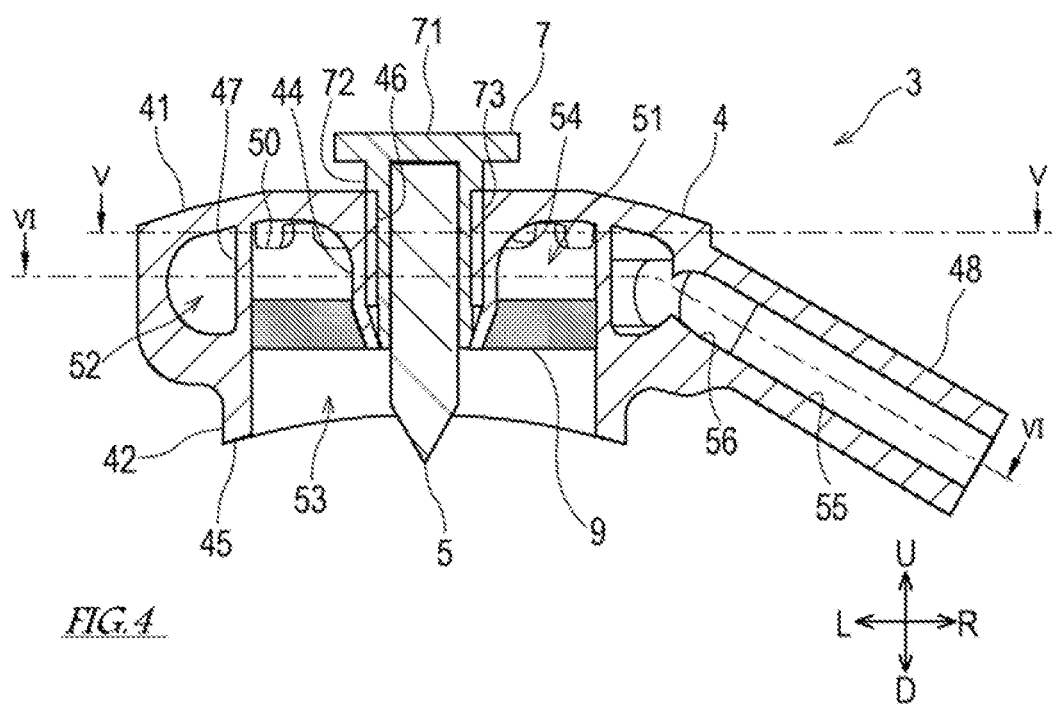
FIG. 4 is a sectional view taken along line IV-IV of FIG. 3.
Figure 5:
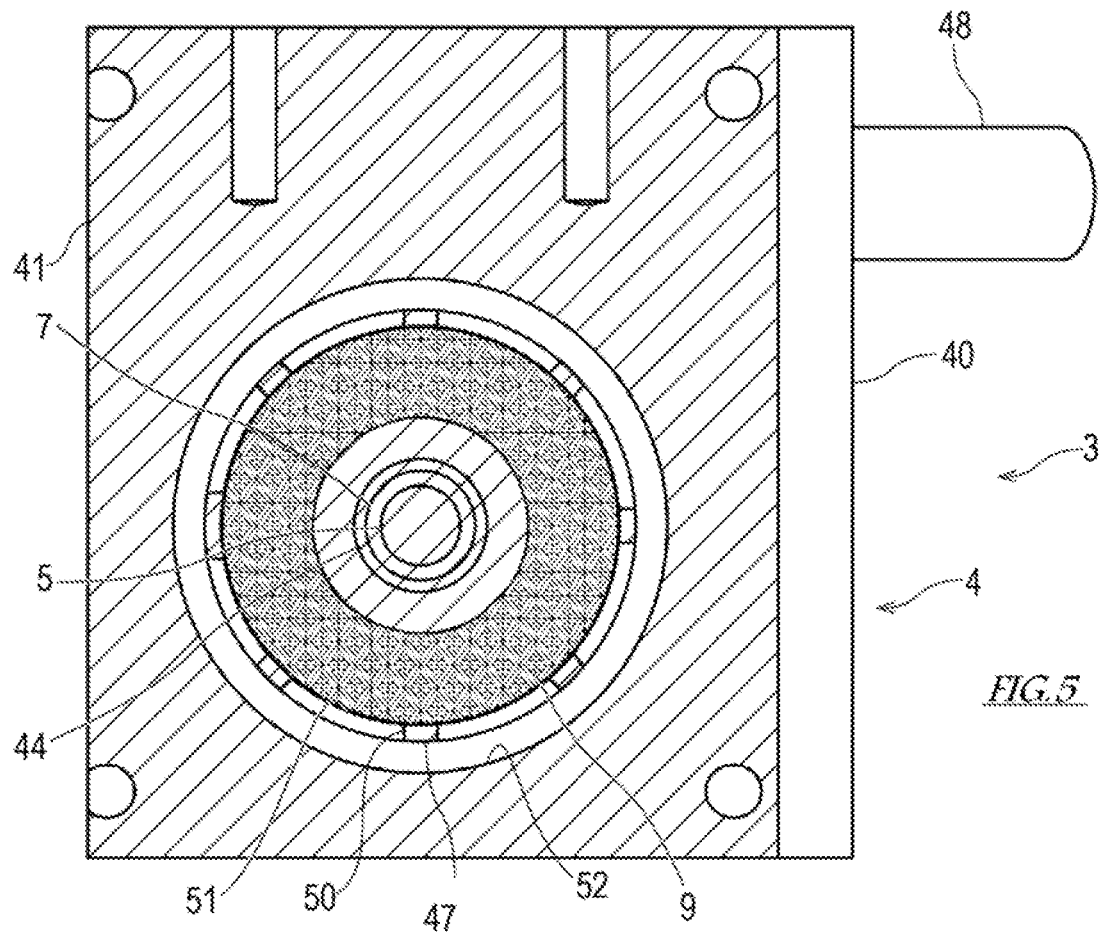
FIG. 5 is a sectional view taken along line V-V of FIG. 4.
Figure 6:
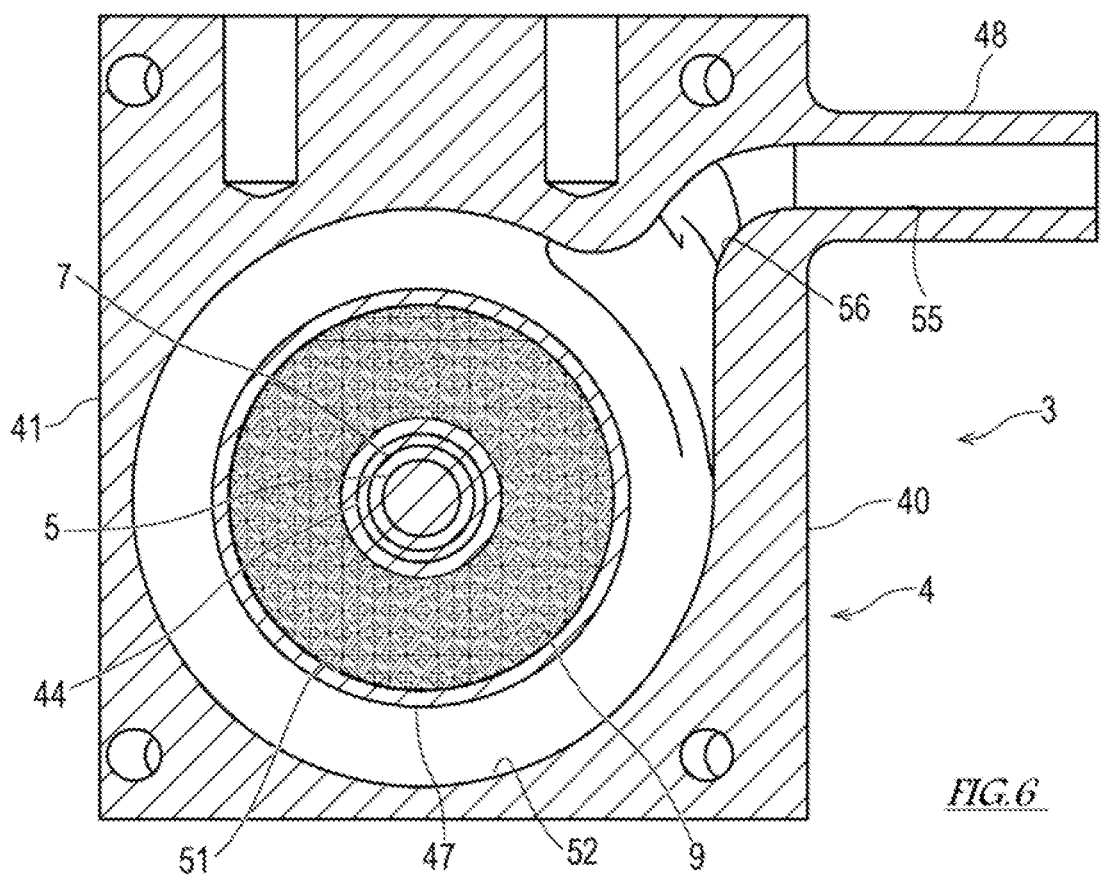
FIG. 6 is a sectional view taken along line VI-VI of FIG. 4.

As shown in FIGS. 3 to 6, the welding torch 3 includes the non-consumable electrode 5, the electrode holder 7, and the torch body 4. The axial direction of the non-consumable electrode 5 is parallel to the radial direction of the tube 10. The non-consumable electrode 5 is held by the electrode holder 7, and the electrode holder 7 is inserted into a sleeve 44 formed in the torch body 4. Hereinafter, for convenience of explanation, as shown in FIGS. 3 and 4, the axial direction of the non-consumable electrode 5 may be referred to as the upward (U) and downward (D) direction, (the distal end is downward, the opposite thereof is upward), the axial direction of the tube 10 may be referred to as the forward (F) and back (B) direction, and the direction orthogonal to the above two directions may be referred to as the left (L) and right (R) direction.

The electrode holder 7 includes a hexagonal plate-shaped head 71 orthogonal to the axial direction of the non-consumable electrode 5, and a holder cylinder portion 72 extending downward from the head 71. The non-consumable electrode 5 is inserted into the holder cylinder portion 72 from below the holder cylinder portion 72. The non-consumable electrode 5 inserted into the electrode holder 7 has a distal end of the non-consumable electrode 5, extending from the electrode holder 7. A screw thread 73 is formed on the outer peripheral surface of the holder cylinder portion 72. Further, a slit (not shown) for allowing a diameter reduction is formed at the distal end of the holder cylinder portion 72, and the holder cylinder portion 72 has a function as a collet.

The torch body 4 integrally includes a base 40 having a substantially rectangular shape when viewed from the radial direction of the tube 10, and a joint portion 48 projecting rightward from the right side of the base 40. A hose (not shown) is connected to the joint portion 48, and the shielding gas is supplied to shielding gas flow paths 51 and 52 formed in the base 40 through the hose.

The base 40 integrally includes the sleeve 44 that holds the electrode holder 7, a flow path forming portion 41 that forms the shielding gas flow paths 51 and 52 around the sleeve 44, a nozzle 42 forming a shielding gas guiding space 53 around the distal end of the non-consumable electrode 5 where the distal end extends from the electrode holder 7, and a gas lens 9 separating a shielding gas flow path 51 from the shielding gas guiding space 53.

The sleeve 44 extends parallel to the radial direction of the tube 10 (that is, the axial direction of the non-consumable electrode 5). A threaded groove 46 is formed on the inner peripheral surface of the sleeve 44. The threaded groove 46 is screwed with the screw thread 73 of the electrode holder 7 which is screwed into the sleeve 44. The distal end (lower end) of the sleeve 44 has a tapered shape that is tapered downward. Due to the tapered shape of the sleeve 44, when the electrode holder 7 is screwed into the threaded groove 46 on the inner periphery of the sleeve 44 in a state where the non-consumable electrode 5 is inserted into the electrode holder 7, the holder cylinder portion 72 is pressurized in the direction of diameter reduction from the distal end of the sleeve 44, so that the non-consumable electrode 5 is held by the electrode holder 7.

The flow path forming portion 41 forms the shielding gas flow paths 51 and 52 around the sleeve 44. The shielding gas flow paths 51 and 52 according to the present embodiment include an inner peripheral flow path 51 and an outer peripheral flow path 52. The inner peripheral flow path 51 is an annular flow path formed around the sleeve 44 and faces the gas lens 9. The outer peripheral flow path 52 is an annular passage formed around the inner peripheral flow path 51. The outer peripheral flow path 52 is connected to a flow path 55 of the joint portion 48 by a connection flow path 56.

The inner peripheral flow path 51 and the outer peripheral flow path 52 are separated by a partition 47. In the partition 47, a communication port 50 is formed, which communicates the inner peripheral flow path 51 and the outer peripheral flow path 52, and allows the shielding gas to flow from the outer peripheral flow path 52 into the inner peripheral flow path 51. In the present embodiment, a plurality of communication ports 50 are provided in the partition 47 so as to be dispersed in the circumferential direction, and the shielding gas flows from the entire periphery of the inner peripheral flow path 51 into the inside thereof.

Each communication port 50 is provided at the upper portion of the partition 47 and at a position closer to the ceiling of the inner peripheral flow path 51, in other words, at a position further away from the gas lens 9. The connection flow path 56 is connected to the outer peripheral flow path 52 below the communication port 50. Therefore, the flow of the shielding gas flowing from the connection flow path 56 into the outer peripheral flow path 52 comes into contact with the partition 47. This prevents the shielding gas from flowing directly into the inner peripheral flow path 51 through the communication port 50.

The ceiling of the inner peripheral flow path 51 is smoothly continuous with the proximal end of the sleeve 44, and the boundary between the proximal end of the sleeve 44 and the ceiling of the inner peripheral flow path 51 is connected with a curved surface. The curved surface portion formed on the wall forming the inner peripheral flow path 51 in this manner functions as a guide portion 54 for deflecting the flow of the shielding gas flowing from the outer peripheral flow path 52 into the inner peripheral flow path 51 toward the gas lens 9.

The nozzle 42 which includes a circumferential lip 45 projecting downward from the flow path forming portion 41 is provided below the flow path forming portion 41. In the present embodiment, the inner peripheral wall of the nozzle 42 and the partition 47 are continuous in the axial direction of the non-consumable electrode 5. The distal end (lower end) of the lip 45 is located above the distal end of the non-consumable electrode 5 and below the distal end of the sleeve 44. The distal end of the lip 45 is curved along the outer peripheral surface of the facing tube 10. The lip 45 extends the distance from the gas lens 9 to the opening edge of the nozzle 42, that is, the length of the nozzle 42.

The nozzle 42 forms the shielding gas guiding space 53 on the inner peripheral side thereof. In the shielding gas guiding space 53, the shielding gas flowing out of the gas lens 9 is straightened so as to flow in a laminar flow parallel to the extending direction of the nozzle 42, that is, the axial direction of the non-consumable electrode 5 without being diffused.

The gas lens 9 straightens the shielding gas in a laminar flow, and separates the inner peripheral flow path 51 from the shielding gas guiding space 53. The gas lens 9 has a hollow disk shape centered on the non-consumable electrode 5. The inner peripheral portion of the gas lens 9 is connected to the outer peripheral surface of the distal end of the sleeve 44, and the outer peripheral portion of the gas lens 9 is connected to the inner peripheral surface of the nozzle 42 (or the inner peripheral surface of the partition 47). The gas lens 9 will be described in detail later.

In addition, the torch body 4 according to the present embodiment consists of conductive metals, and is manufactured by metal 3D printer. However, the joint portion 48 does not necessarily have to be integrally formed on the torch body 4, and may be joined to the torch body 4 by welding or a screw structure. When the torch body 4 is manufactured with the metal 3D printer, a laser beam is radiated onto the metal powder as a raw material, for example. The radiation of the laser light melts the metal powder and fuses the molten metal powder to produce a solid structure. The material of the metal powder is, for example, copper and copper alloy, steel, stainless steel, aluminum, titanium, nickel alloy and the like.

In the welding torch 3 configured as described above, the shielding gas guided through the flow path 55 of the joint portion 48 first flows into the outer peripheral flow path 52 through the connection flow path 56. The shielding gas diffused to the outer peripheral flow path 52 flows into the inner peripheral flow path 51 through the communication port 50. The flow of the shielding gas flowing into the inner peripheral flow path 51 is directed from the communication port 50 to the sleeve 44, comes into contact with the guide portion 54 located at the boundary between the ceiling of the inner peripheral flow path 51 and the sleeve 44, and is guided to the curved surface of the guide portion 54 to change its direction, and goes to the gas lens 9. The shielding gas is straightened while passing through the gas lens 9 to form a laminar flow, and flows out to the shielding gas guiding space 53 to spout from the distal end of the nozzle 42 toward the tube 10.

[Configuration of Gas Lens 9]

Figure 7:
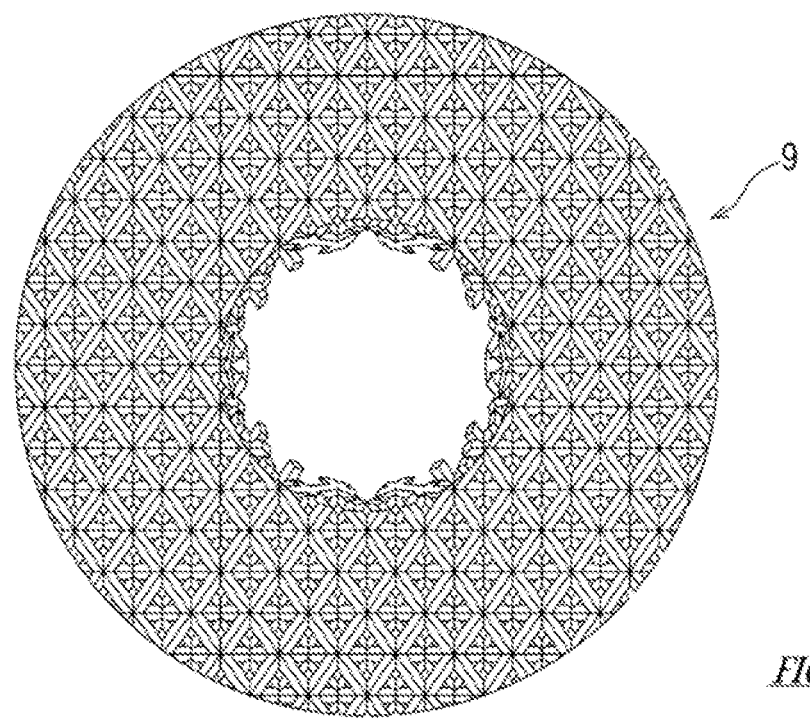
FIG. 7 is a plan view of a gas lens.
Figure 8:
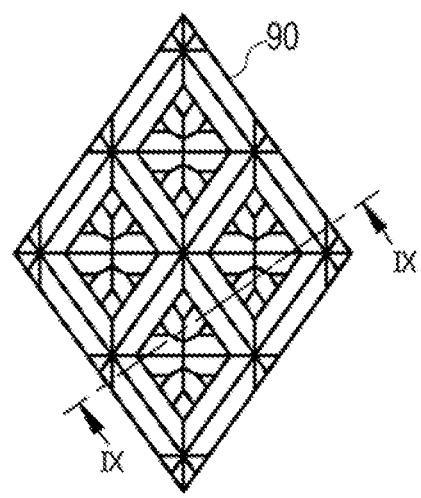
FIG. 8 is a partial enlarged plan view of the gas lens.
Figure 9:
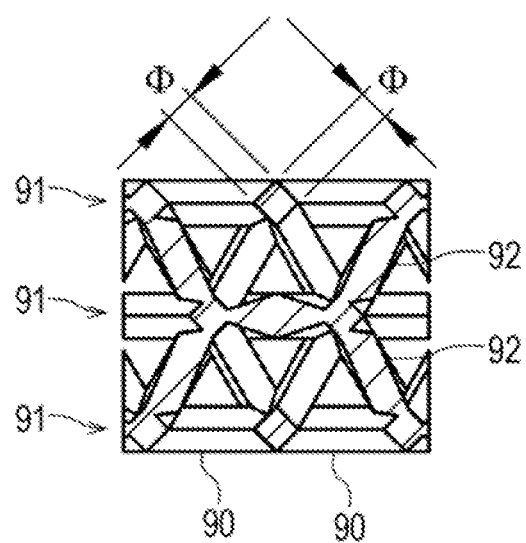
FIG. 9 is a sectional view taken along line IX-IX in FIG. 8.
Figure 10:
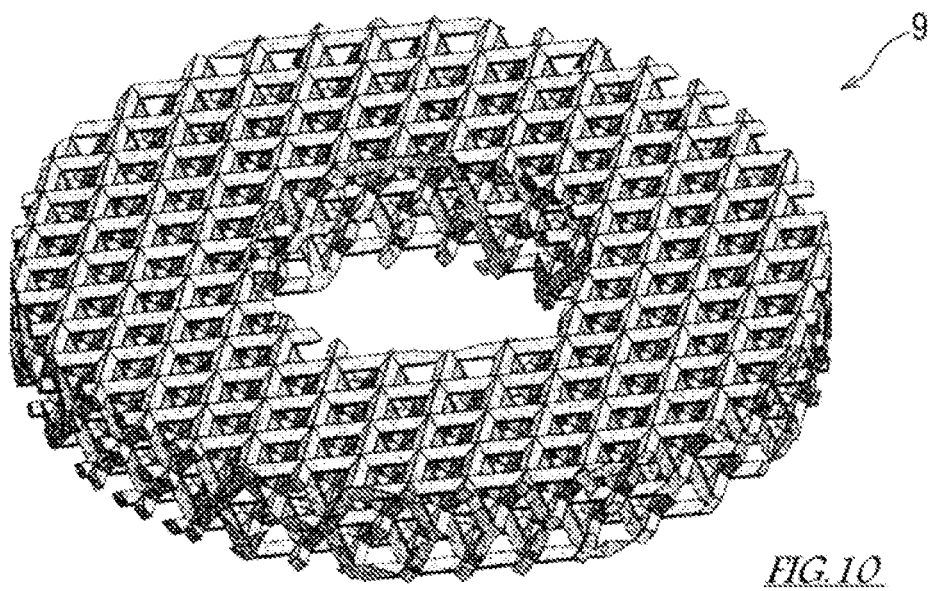
FIG. 10 is a perspective view of the gas lens.

Here, the configuration of the gas lens 9 will be described in detail. FIG. 7 is a plan view of the gas lens 9, FIG. 8 is a partial enlarged plan view of the gas lens 9, FIG. 9 is a sectional view taken along line IX-IX of FIG. 8, and FIG. 10 is a perspective view of the gas lens.

As shown in FIGS. 7 to 10, the gas lens 9 has a lattice structure. In other words, the gas lens 9 is a three-dimensional mesh lattice in which elongated beams 90 and 92 are joined in a three-dimensional manner. Note that the diameter Φ of the elongated beams 90 and 92 forming the lattice structure is about 0.2 mm at the minimum so that the elongated beams 90 and 92 can be manufactured by a metal 3D printer.

In the gas lens 9 according to the present embodiment, mesh sheets 91 formed by joining cross beams 90 in a planar manner are stacked in the axial direction of the non-consumable electrode 5 with different phases. Furthermore, the lattice points of the mesh sheets 91 vertically stacked are joined by vertical beams 92. The gas lens 9 having such a lattice structure has regular gaps formed by the beams 90 and 92. In FIG. 8, a lattice of four cells of the mesh sheet 91 is shown, and a state in which a plurality of the mesh sheets 91 are stacked in the thickness direction with different phases is shown. Further, in FIG. 9, a three-dimensional mesh lattice is apparent in which the lattice points of the mesh sheets 91 are joined together by oblique vertical beams 92.

In the gas lens 9 configured as described above, the inner peripheral portion of the gas lens 9 connected to the distal end of the sleeve 44 is required to have high rigidity, compared with the remaining portion of the gas lens 9 in order to withstand the pressure from the electrode holder 7 screwed into the sleeve 44. Therefore, the porosity of the inner peripheral portion of the gas lens 9, in particular, the porosity of the coupling portion with the sleeve 44, is kept at a low value (for example, 10% or less), compared with the remaining portion of the gas lens 9. The porosity can be determined from the apparent volume and the true density of the constituent material of the gas lens 9.

As described above, the welding torch 3 of the present embodiment includes the gas lens 9 of a lattice structure that straightens a shielding gas.

Further, the all-position welding device 1 of the present embodiment includes the welding torch 3 and the rotation mechanism 2 for rotating the welding torch 3 around the tube 10.

In the welding torch 3 and the all-position welding device 1, the gas lens 9 has a lattice structure. By forming the gas lens 9 in a lattice structure, the gas lens 9 formed by using a 3D printer has regular gaps. Therefore, the porosity of the gas lens 9 is stabilized, compared with the case where the gas lens 9 is a porous body. Therefore, the improvement of the yield of the welding torch 3 including the gas lens 9 is expected.

Further, in the welding torch 3 of the above embodiment, the gas lens 9 has a structure in which the mesh sheets 91 each formed by joining a plurality of beams 90 in a planar manner are stacked in the thickness direction with different phases. The lattice points of the stacked mesh sheets 91 are joined together by the vertical beams 92.

In the above embodiment, the gas lens 9 of the welding torch 3 has a three-dimensional mesh lattice structure in which the cross beams 90 and the vertical beams 92 are joined together, but the present invention is not limited to this. The gas lens 9 may have a lattice structure that can form regular gaps using a 3D printer. For example, the gas lens 9 may have a structure in which the mesh sheets 91 formed by joining a plurality of beams 90 in a planar manner are superimposed in several layers with different phases. However, as in the present embodiment, the vertical beams 92 connecting the lattice points are provided between the layers of the mesh sheets 91, so that the shielding gas passing through the gas lens 9 is straightened by not only the cross beams 90 but also the vertical beams 92 of the lattice structure. Therefore, compared with the case where the vertical beams 92 are not provided, the same straightening effect can be obtained even if the number of the stacked mesh sheets 91 is reduced. In other words, compared with the case where the vertical beams 92 are not provided, the number of the stacked mesh sheets 91 can be reduced, and the thickness of the gas lens 9 (that is, the dimension of the non-consumable electrode 5 in the axial direction) can be suppressed.

Further, the welding torch 3 according to the present embodiment includes the non-consumable electrode 5, the electrode holder 7 into which the non-consumable electrode 5 is inserted, the sleeve 44 that holds the electrode holder 7, and the torch body 4 having the flow path forming portion 41 forming the shielding gas flow path 51 around the sleeve 44 and the nozzle 42 forming the shielding gas guiding space 53 around the distal end of the non-consumable electrode 5 where the distal end extends from the electrode holder 7. The gas lens 9 is provided to separate the shielding gas flow path 51 of the torch body 4 from the shielding gas guiding space 53.

In the welding torch 3 according to the present embodiment, the inner peripheral portion of the gas lens 9 is connected to the outer peripheral surface of the sleeve 44, and the outer peripheral portion of the gas lens 9 is connected to the inner peripheral surface of the nozzle 42 (or the partition 47).

Thus, it is possible to prevent the shielding gas that does not pass through the gas lens 9 from leaking from the gap between the shielding gas flow path 51 and the shielding gas guiding space 53. Also, when the gas lens 9 is integrally formed with other elements of the torch body 4 using a metal 3D printer, the inner peripheral portion of the gas lens 9 is supported by the rigid sleeve 44, and the outer peripheral portion of the gas lens 9 is supported by the rigid nozzle 42, so that the gas lens 9 is stably formed.

Further, in the welding torch 3 according to the present embodiment, the gas lens 9 is integrally formed with the sleeve 44 and the nozzle 42. In the present embodiment, the gas lens 9, the sleeve 44 and the nozzle 42 of the torch body 4 are formed by a metal 3D printer.

As described above, the welding torch 3 in which a solid metal portion and the gas lens 9 having a higher porosity than that of the solid metal portion are combined with one torch body 4 using the forming technology using the metal 3D printer can be manufactured inexpensively.

Further, in the welding torch 3 according to the present embodiment, the shielding gas flow paths 51 and 52 include the inner peripheral flow path 51 formed around the sleeve 44 and facing the gas lens 9, and the outer peripheral flow path 52 formed around the inner peripheral flow path 51 and separated from the inner peripheral flow path 51 by the partition 47. The partition 47 is provided with the communication port 50 that allows the shielding gas to flow from the outer peripheral flow path 52 to the inner peripheral flow path 51.

In this way, by forming the shielding gas flow paths 51 and 52 into an inner/outer double structure of the inner peripheral flow path 51 and the outer peripheral flow path 52 provided on the outer peripheral side of the inner peripheral flow path 51, the shielding gas can be sufficiently laminarized even if the dimension (that is, the thickness) in the direction parallel to the axial direction of the non-consumable electrode 5 of the torch body 4 is reduced. As a result, the welding torch 3 can be flattened, that is, the thickness can be reduced, compared with the case where the shielding gas flow path is a single space.

Further, in the welding torch 3 according to the present embodiment, the guide portion 54 that deflects the flow of the shielding gas flowing from the outer peripheral flow path 52 into the inner peripheral flow path 51 toward the gas lens 9 is formed on the wall forming the inner peripheral flow path 51.

As a result, the flow of the shielding gas that has flowed into the inner peripheral flow path 51 is efficiently guided to the gas lens 9 without colliding with the walls other than the guide portion 54 and without being diffused.

[Modification]

Although the preferred embodiment of the present invention has been described above, it is also possible to include modifications of the specific structure and/or function of the above embodiment in detail without departing from the spirit of the present invention. The above configuration can be modified, for example, as follows. In the description of the first to third modifications, the same or similar members as or to those of the embodiment described above are designated by the same reference numerals, and the description thereof will be omitted.

(First Modification)

In the welding torch 3 according to the above-described embodiment, the communication port 50 provided in the partition 47 between the inner peripheral flow path 51 and the outer peripheral flow path 52 is a hole penetrating the partition 47. However, the aspect of the communication port 50 is not limited to this. The communication port 50 may be, for example, a slit or a tapered hole (see FIG. 12) which expands in diameter toward the inner peripheral flow path 51. Also, the communication port 50 may be provided with an obstacle such as a swirl vane in order to provide flow resistance to the shielding gas passing through the communication port 50.

(Second Modification)

Figure 11:
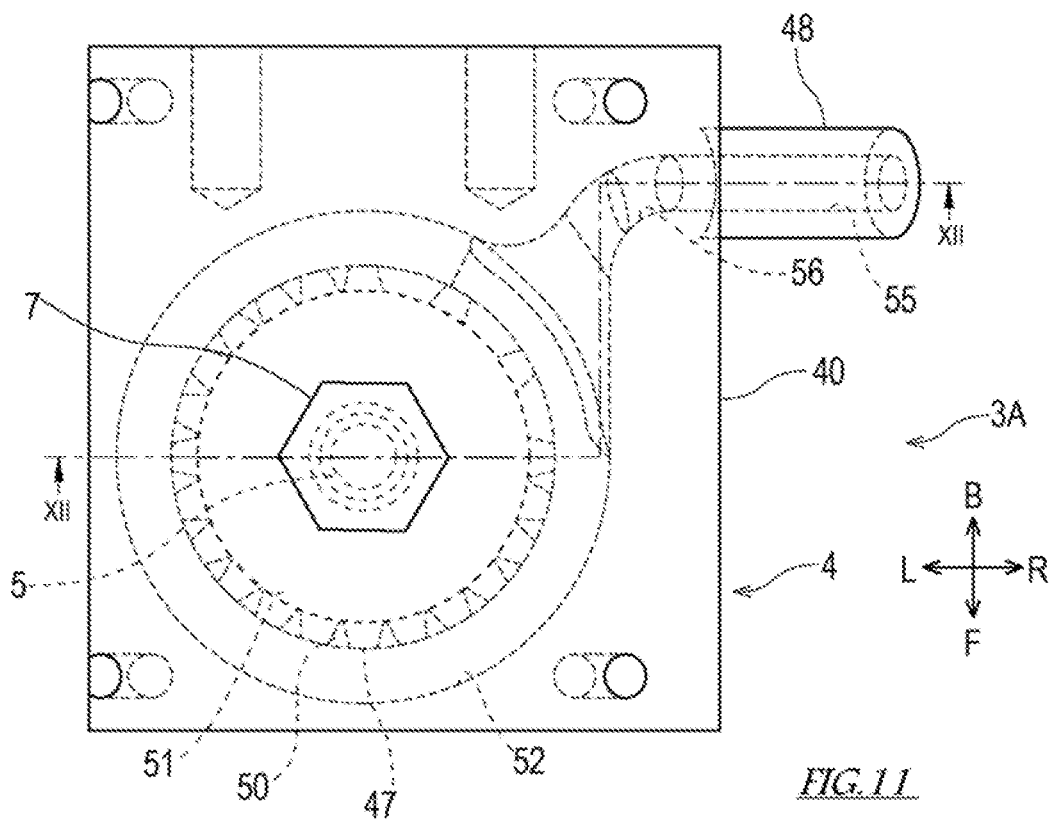
FIG. 11 is a plan view of a welding torch according to a second modification.
Figure 12:
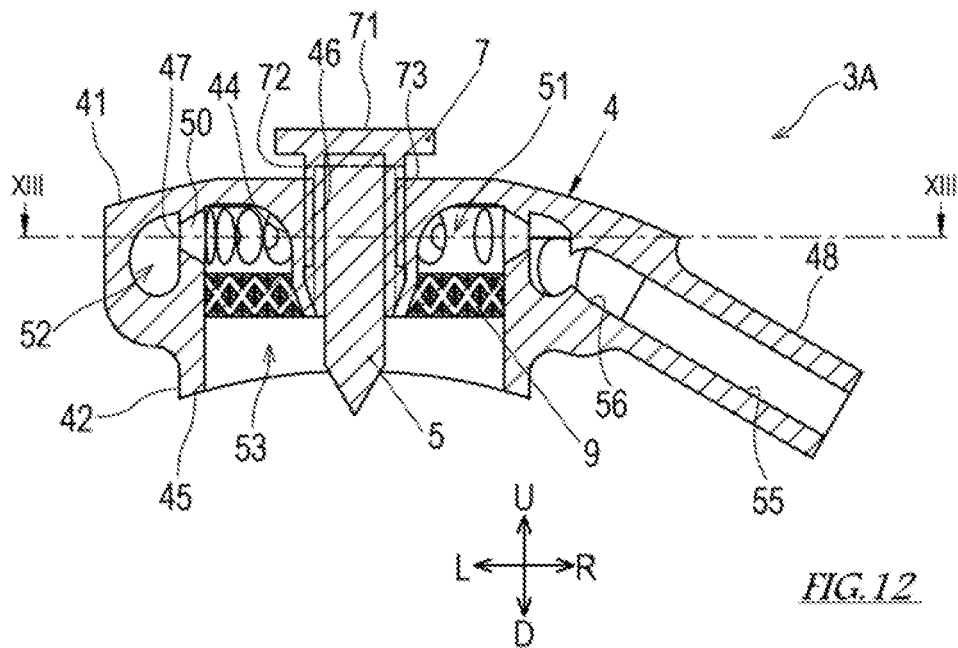
FIG. 12 is a sectional view taken along line XII-XII of FIG. 11.
Figure 13:
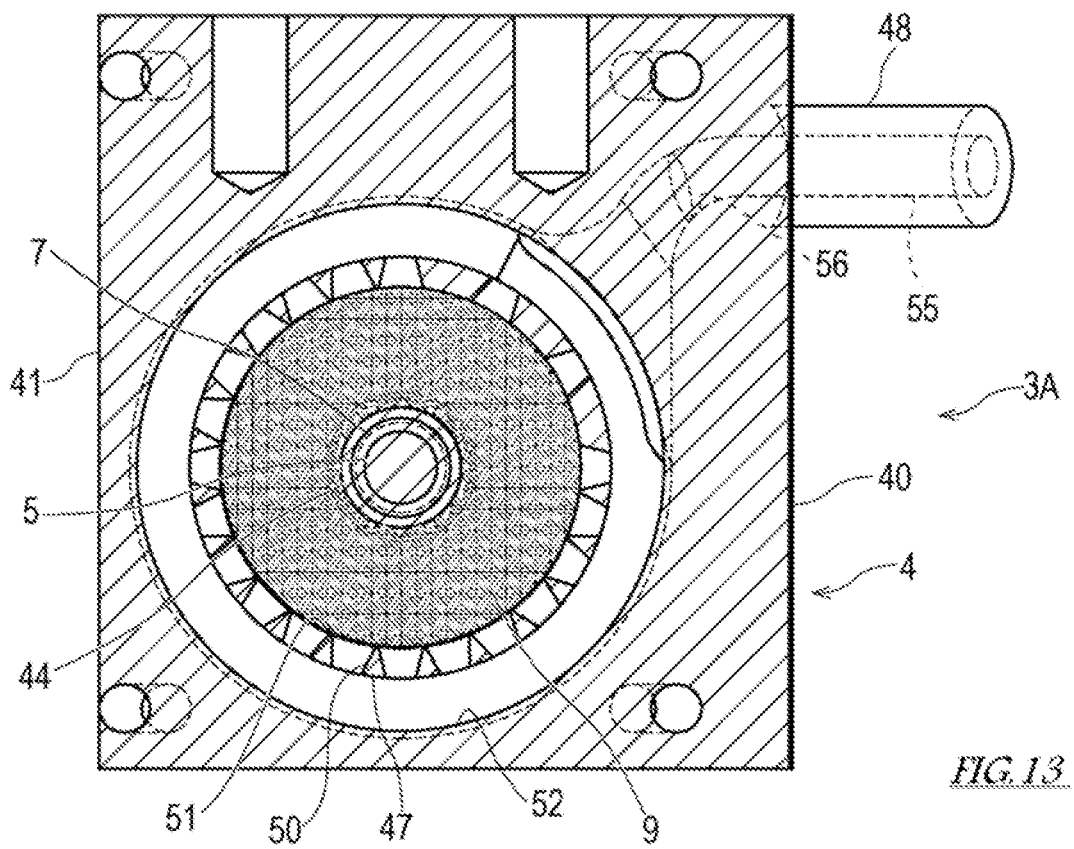
FIG. 13 is a sectional view taken along line XIII-XIII of FIG. 12.

In the welding torch 3 according to the embodiment, the communication ports 50 provided in the partition 47 between the inner peripheral flow path 51 and the outer peripheral flow path 52 are arranged in the partition 47 at equal intervals in the circumferential direction. However, the arrangement of the communication port 50 is not limited to the above embodiment, and may be provided in the partition 47 disproportionately in the circumferential direction. FIG. 11 is a plan view of a welding torch 3A according to a second modification, FIG. 12 is a sectional view taken along line XII-XII in FIG. 11, and FIG. 13 is a sectional view taken along line in FIG. 12. In the welding torch 3A according to the second modification shown in FIGS. 11 to 13, when the outer peripheral flow path 52 is divided in the circumferential direction into two portions consisting of a first portion including an inflow portion of the shielding gas and a remaining second portion, the opening ratio of the partition 47 of the second portion is larger than the opening ratio of the partition 47 of the first portion. Here, the inflow portion of the shielding gas in the outer peripheral flow path 52 is a connection portion between the outer peripheral flow path 52 and the connection flow path 56.

In particular, as is clearly shown in FIGS. 11 and 13 in the welding torch 3A according to the second modification, a plurality of communication ports 50 of the same size are formed in the partition 47, and the number of the communication ports 50 provided in the partition 47 of the second portion is larger than the number of the communication ports 50 provided in the partition 47 of the first portion. As a result, the opening ratio of the partition 47 of the second portion is larger than the opening ratio of the partition 47 of the first portion. However, by making the opening area of the communication port 50 provided in the partition 47 of the second portion larger than the opening area of the communication port 50 provided in the partition 47 of the first portion, the opening ratio of the partition 47 of the second portion may be larger than the opening ratio of the partition 47 of the first portion.

As described above, by making the opening ratio of the partition 47 of the second portion larger than the opening ratio of the partition 47 of the first portion of the outer peripheral flow path 52, the shielding gas that has flowed into the first portion of the outer peripheral flow path 52 is likely to spread around the second portion, so that the shielding gas can be diffused in the outer peripheral flow path 52.

(Third Modification)

Figure 14:
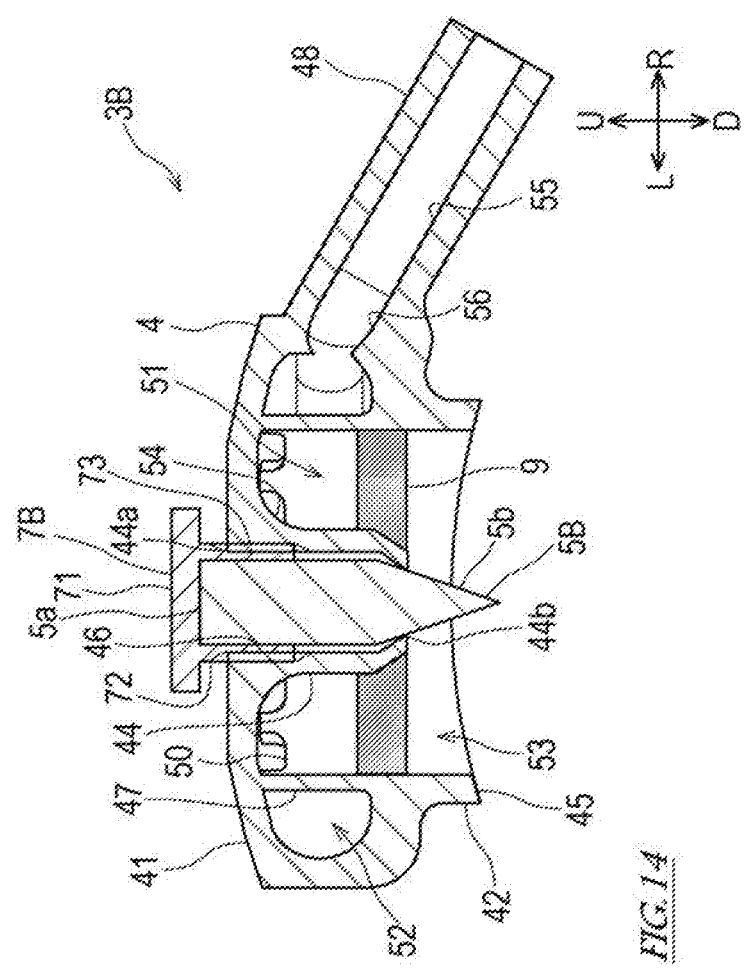
FIG. 14 is a plan view of a welding torch according to a third modification.

In the welding torch 3 according to the above embodiment, the electrode holder 7 has a function as a collet in the cylinder portion 72 thereof. However, the function as a collet can also be omitted from the electrode holder 7 as in a welding torch 3B according to the third modification demonstrated below. FIG. 14 is a plan view of the welding torch 3B according to the third modification.

The welding torch 3B according to the third modification includes a non-consumable electrode 5B, an electrode holder 7B, and the torch body 4. The non-consumable electrode 5 is held by the electrode holder 7B, and the electrode holder 7B is inserted into the sleeve 44 formed in the torch body 4.

The non-consumable electrode 5B includes an electrode shaft portion 5a and an electrode tapered portion 5b whose diameter gradually decreases from the electrode shaft portion 5a toward the distal end thereof.

The electrode holder 7B integrally includes the holder cylinder portion 72, the screw thread 73 (first threaded portion) formed on the outer peripheral wall of the holder cylinder portion 72, and the holder head 71 that closes one of the end openings of the holder cylinder portion 72. Although the length of the holder cylinder portion 72 of the welding torch 3 according to the above embodiment is substantially the same as the length from a sleeve inlet 44a to a sleeve outlet 44b (see FIG. 4), the length of the holder cylinder portion 72 of the welding torch 3B according to the present modification is shorter than the length from the sleeve inlet 44a to the sleeve outlet 44b. Therefore, the distal end of the holder cylinder portion 72 screwed into the sleeve 44 does not reach the sleeve outlet 44b.

Unlike the above-described embodiment, the holder cylinder portion 72 is not formed with a slot. That is, the holder cylinder portion 72 according to this modification does not have the function as a collet. The screw thread 73 is provided on the outer peripheral portion of the cylinder portion 72. The inner diameter of the holder cylinder portion 72 is slightly larger than the outer diameter of the electrode shaft portion 5a so that the electrode shaft portion 5a can be inserted loosely. The outer diameter of the electrode shaft portion 5a may be larger than the outer diameter of the non-consumable electrode 5 according to the above-described embodiment, and the former may be 1.5 times or more the latter.

The sleeve 44 includes the sleeve inlet 44a into which the non-consumable electrode 5B and the holder cylinder portion 72 are inserted, the threaded groove 46 (second threaded portion) screwed with the screw thread 73, and the sleeve outlet 44b having an inner diameter larger than the minimum diameter and smaller than the maximum diameter of the electrode tapered portion 5b. In this modification, the threaded groove 46 is provided in the sleeve 44, and the screw thread 73 is provided in the electrode holder 7B. However, the screw thread may be provided in the sleeve 44, and the threaded groove may be provided in the electrode holder 7B. The screw thread 73 of the electrode holder 7B is screwed with the threaded groove 46 of the sleeve 44, thereby allowing the movement of the electrode holder 7B in the insertion/removal direction. That is, when the electrode holder 7B rotates relative to the sleeve 44, the electrode holder 7B can be moved relative to the sleeve 44 in the insertion/removal direction.

In the sleeve 44 according to this modification, the vicinity of the sleeve outlet 44b has a tapered shape that gradually reduces toward the distal end. The gradient of this tapered shape is larger than the gradient of the electrode tapered portion 5b. However, the vicinity of the sleeve outlet 44b does not have to be tapered. For example, the end face of the sleeve 44 on the sleeve outlet 44b side may be closed, and an opening serving as the sleeve outlet 44b may be provided.

In the welding torch 3B configured as described above, the length from the sleeve inlet 44a to the sleeve outlet 44b is longer than the length of the holder cylinder portion 72, and shorter than the length of the non-consumable electrode 5B. Therefore, the welding torch 3B inserted into the sleeve 44 from the sleeve inlet 44a has a distal end portion projecting from the sleeve outlet 44b. The movement of the non-consumable electrode 5B in the insertion direction into the sleeve 44 is restricted by the contact of the electrode tapered portion 5b with the opening edge of the sleeve outlet 44b. Therefore, the projection length of the non-consumable electrode 5B from the sleeve 44 can be adjusted by the length or the gradient of a tapered portion 59.

In the welding torch 3B configured as described above, the holder cylinder portion 72 is inserted into the sleeve 44, the electrode shaft portion 5a is inserted into the holder cylinder portion 72, an electrode tapered portion 55b comes into contact with the opening edge of the sleeve outlet 44b, and electrode shaft portion 5a comes contact with the holder head 71. By screwing the electrode holder 7B into the sleeve 44, the non-consumable electrode 5B is axially pressurized between the sleeve 44 and the electrode holder 7B. That is, the non-consumable electrode 5B is held by the torch body 4 by the axial force of the electrode holder 7B.

As described above, in the welding torch 3B according to the present modification, the collet is omitted, but the non-consumable electrode 5B is held in a state where the relative position is fixed to the torch body 4 by the sleeve 44 and the electrode holder 7B. In the welding torch 3B, since the electrode holder 7B is not equipped with the collet which is a consumable part, the electrode holder 7B can be reused when the non-consumable electrode 5B is replaced.

REFERENCE SIGN LIST 1 all-position welding device
2 rotation mechanism
3, 3A, 3B welding torch
4 torch body
5, 5B non-consumable electrode
5a electrode shaft portion
5b electrode tapered portion
5t tapered portion
7, 7B electrode holder
71 holder head
72 holder cylinder portion
73 screw thread
9 gas lens
10 tube
11 base plate
12, 14, 16 linear motion mechanism
19 clamp mechanism
20 table
21 rotating member
22, 23, 24 driven gear
25 drive gear
26 motor
40 base
41 flow path forming portion
42 nozzle
44 sleeve
44a sleeve inlet
44b sleeve outlet
45 lip
46 threaded groove
47 partition
48 joint portion
50 communication port
51 inner peripheral flow path (shielding gas flow passage)
52 outer peripheral flow path (shielding gas flow passage)
53 shielding gas guiding space
54 guide portion
56 connection flow path
90, 92 beam
91 mesh sheet

The invention claimed is:

1. A welding torch comprising:
   a non-consumable electrode; and
   a gas lens of a lattice structure that straightens a shielding gas so as to flow in a laminar flow parallel to an axial direction of the non-consumable electrode, wherein:
   the gas lens has a three-dimensional mesh lattice structure in which at least a plurality of beams are joined together, the plurality of beams including first beams and second beams,
   the first beams are joined in a planar manner so as to constitute a first mesh sheet and a second mesh sheet, the first mesh sheet and the second mesh sheet are stacked in the axial direction, and
   each of the second beams joins a lattice point of the first mesh sheet and a lattice point of the second mesh sheet.

2. The welding torch according to claim 1, wherein the welding torch further includes
   an electrode holder that holds the non-consumable electrode; and
   a torch body including a sleeve into which the electrode holder is inserted, a shielding gas flow path around the sleeve, and a nozzle that forms a shielding gas guiding space around a distal end of the non-consumable electrode, the distal end extending from the electrode holder,
   wherein the gas lens is provided so as to separate the shielding gas flow path of the torch body from the shielding gas guiding space.

3. The welding torch according to claim 2,
   wherein an inner peripheral portion of the gas lens is connected to an outer peripheral surface of the sleeve, and an outer peripheral portion of the gas lens is connected to an inner peripheral surface of the nozzle.

4. The welding torch according to claim 2,
   wherein the gas lens is integrally formed with the sleeve and the nozzle.

5. The welding torch according to claim 2,
   wherein the shielding gas flow path includes an inner peripheral flow path formed around the sleeve and facing the gas lens, and an outer peripheral flow path formed around the inner peripheral flow path and separated from the inner peripheral flow path by a partition, and wherein the partition is provided with a communication port for allowing inflow of a shielding gas from the outer peripheral flow path to the inner peripheral flow path.

6. The welding torch according to claim 5, wherein when the outer peripheral flow path is divided in a circumferential direction into two portions consisting of a first portion including an inflow portion of the shielding gas and an remaining second portion, an opening ratio of the partition of the second portion is larger than an opening ratio of the partition of the first portion.

7. The welding torch according to claim 5, wherein a guide portion is formed on a wall forming the inner peripheral flow path, the guide portion deflecting a flow of the shielding gas flowing from the outer peripheral flow path into the inner peripheral flow path toward the gas lens.

8. The welding torch according to claim 2, wherein the non-consumable electrode includes an electrode shaft portion and an electrode tapered portion whose diameter gradually decreases from the electrode shaft portion toward a distal end of the electrode tapered portion, wherein the electrode holder includes a holder cylinder portion without a slot, a first threaded portion formed on an outer peripheral wall of the holder cylinder portion, and a holder head for closing one of end openings of the holder cylinder portion, wherein the sleeve includes a sleeve inlet into which the non-consumable electrode and the holder cylinder portion are inserted, a second threaded portion screwed with the first threaded portion to allow movement of the electrode holder in an insertion/removal direction, and a sleeve outlet having an inner diameter larger than a minimum diameter and smaller than a maximum diameter of the electrode tapered portion, and wherein the holder cylinder portion is inserted into the sleeve, the electrode shaft portion is inserted into the holder cylinder portion, the electrode tapered portion comes into contact with an opening edge of the sleeve outlet, and the electrode shaft portion comes into contact with the holder head.

9. An all-position welding device that performs butt welding of tubes, the all-position welding device comprising:
the welding torch according to any one of claim 1; and
a rotation mechanism for rotating the welding torch around the tubes.

* * * * *